(12) United States Patent
Naito et al.

(10) Patent No.: US 11,404,713 B2
(45) Date of Patent: Aug. 2, 2022

(54) FUEL CELL STACK AND METHOD OF ASSEMBLING THE FUEL CELL STACK

(71) Applicant: HONDA MOTOR CO., LTD., Tokyo (JP)

(72) Inventors: Hideharu Naito, Wako (JP); Masahiro Sato, Wako (JP); Takahiro Tanaka, Wako (JP); Jun Tanaka, Wako (JP); Yosuke Konno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 16/675,246

(22) Filed: Nov. 6, 2019

(65) Prior Publication Data
US 2020/0153023 A1 May 14, 2020

(30) Foreign Application Priority Data
Nov. 9, 2018 (JP) .............................. JP2018-211490

(51) Int. Cl.
*H01M 8/2475* (2016.01)
*H01M 8/2404* (2016.01)

(52) U.S. Cl.
CPC ....... *H01M 8/2475* (2013.01); *H01M 8/2404* (2016.02); *H01M 2250/20* (2013.01)

(58) Field of Classification Search
CPC . B60L 50/72; H01M 2250/20; H01M 8/2404; H01M 8/2475
See application file for complete search history.

(56) References Cited

U.S. PATENT DOCUMENTS

| 5,547,777 A | 8/1996 | Richards |
| 10,693,172 B2 | 6/2020 | Nara et al. |
| 2016/0013508 A1* | 1/2016 | Martinchek ......... H01M 8/2404 429/469 |

FOREIGN PATENT DOCUMENTS

| JP | 2016-18783 | 2/2016 |
| JP | 2017-216100 | 12/2017 |
| JP | 2018-133235 | 8/2018 |

OTHER PUBLICATIONS

Japanese Office Action for Japanese Patent Application No. 2018-211490 dated Nov. 2, 2021.

* cited by examiner

*Primary Examiner* — Adam A Arciero
(74) *Attorney, Agent, or Firm* — Amin, Turocy & Watson, LLP

(57) ABSTRACT

A fuel cell stack includes a cell stack body, a stack case containing the cell stack body, and an end plate fixed to an end of the stack case. At least two recesses are provided at the end of the stack case, each of the recesses holding one end of each of positioning pins which position the stack case and the end plate. At least two positioning holes, into which the positioning pins are inserted, are provided in the end plate correspondingly to the at least two recesses.

14 Claims, 9 Drawing Sheets

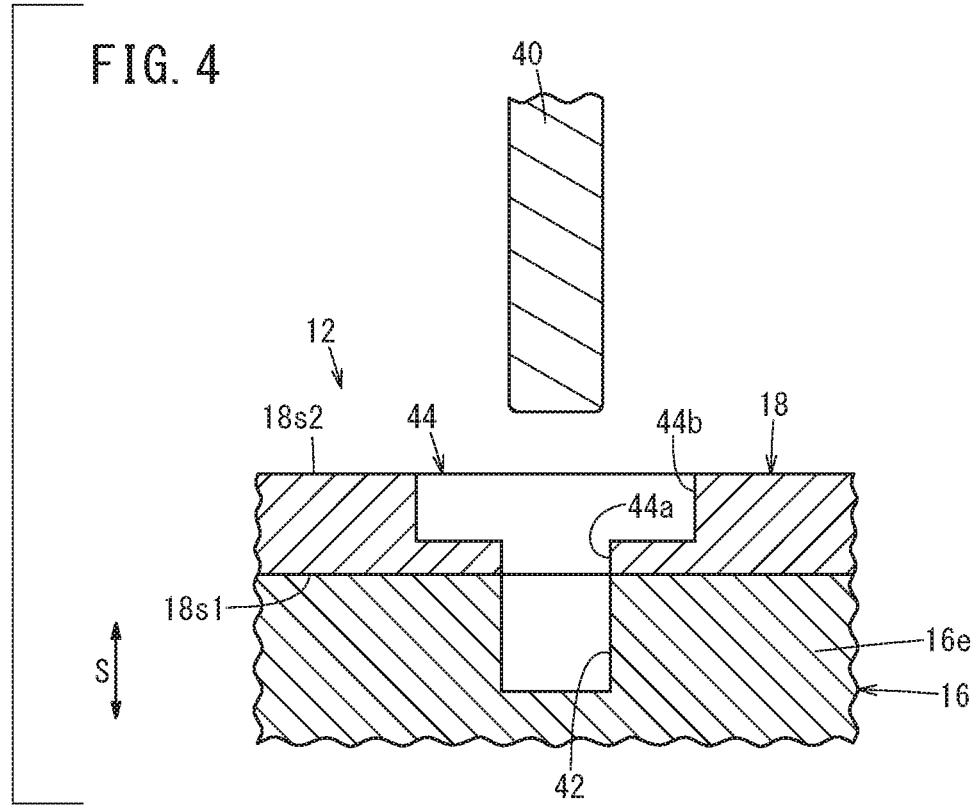

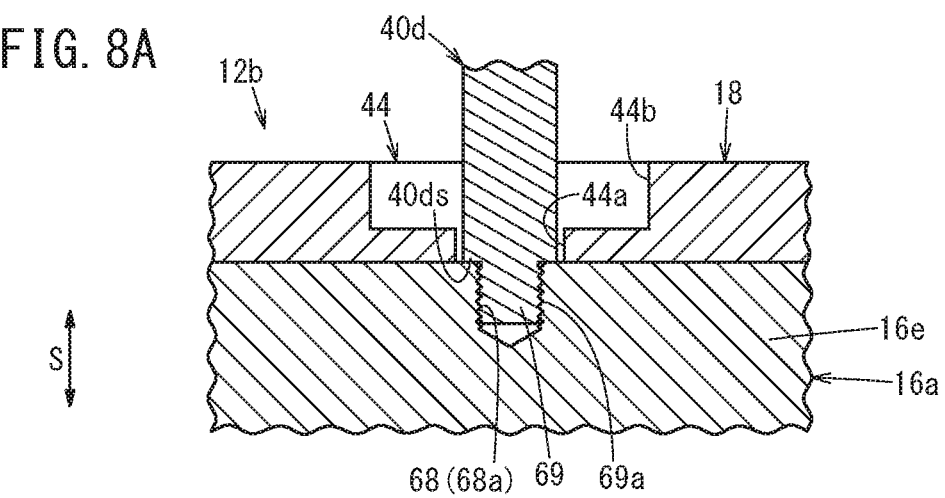
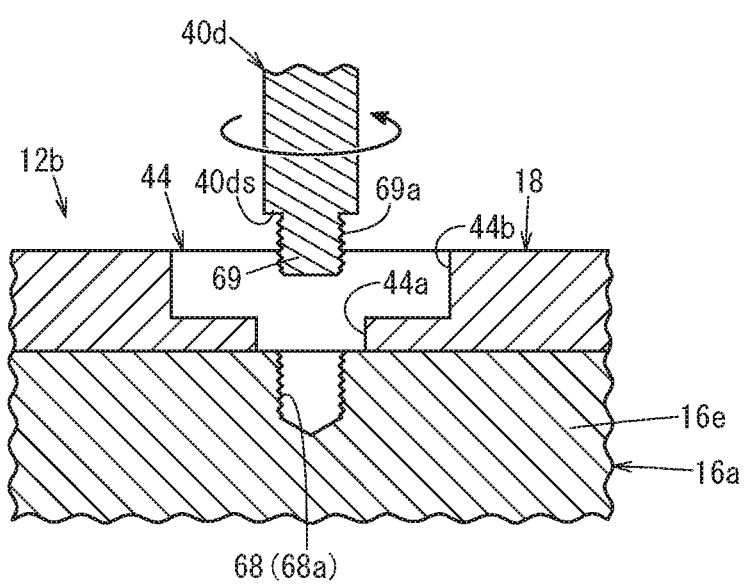
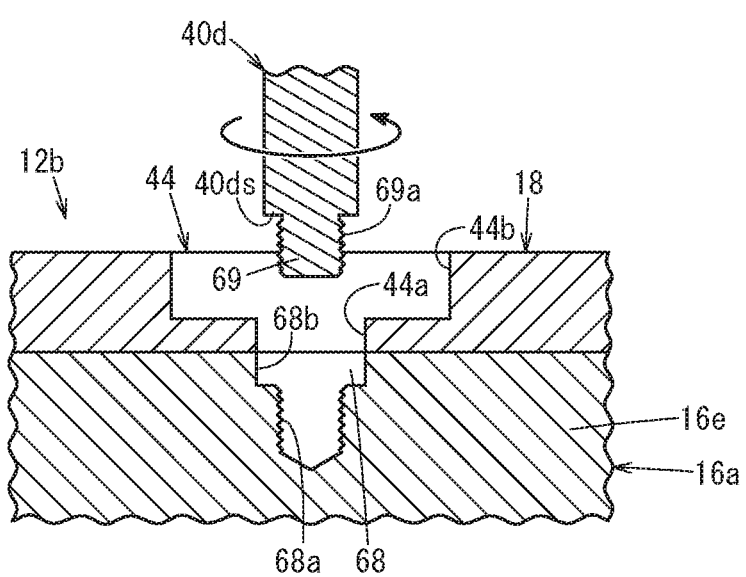

FUEL CELL STACK AND METHOD OF ASSEMBLING THE FUEL CELL STACK

CROSS-REFERENCE TO RELATED APPLICATION

This application is based upon and claims the benefit of priority from Japanese Patent Application No. 2018-211490 filed on Nov. 9, 2018, the contents of which are incorporated herein by reference.

BACKGROUND OF THE INVENTION

Field of the Invention

The present invention relates to a fuel cell stack and a method of assembling the fuel cell stack.

Description of the Related Art

A power generation cell is formed by sandwiching a membrane electrode assembly between separators. Normally, a plurality of power generation cells are stacked together, and the fuel cell including the plurality of power generation cells is mounted as an in-vehicle fuel cell stack, in a fuel cell vehicle. The in-vehicle fuel cell stack adopts structure where a cell stack body formed by stacking the plurality of power generation cells is accommodated in a stack case.

For example, Japanese Laid-Open Patent Publication No. 2016-018783 discloses a fuel cell stack where an end plate for applying a tightening load to a cell stack body in a stacking direction is joined to an end of a stack case using bolts.

SUMMARY OF THE INVENTION

The present invention has been made in relation to the above conventional technique, and an object of the present invention is to provide a fuel cell stack and a method of assembling the fuel cell stack in which it is possible to easily perform operation of fixing an end plate to a stack case.

According to a first aspect of the present invention, provided is a fuel cell stack including a cell stack body including a plurality of stacked power generation cells, a stack case containing the cell stack body, and an end plate fixed to an end of the stack case and configured to apply a tightening load to the cell stack body in a stacking direction, wherein at least two recesses are provided at the end of the stack case, each of the at least two recesses being configured to hold one end of each of positioning pins configured to position the stack case and the end plate, and at least two positioning holes, into which the positioning pins are inserted, are provided in the end plate correspondingly to the at least two recesses.

According to a second aspect of the present invention, provided is a method of assembling a fuel cell stack, the fuel cell stack including a cell stack body including a plurality of stacked power generation cells, a stack case containing the cell stack body, and an end plate fixed to an end of the stack case and configured to apply a tightening load to the cell stack body in a stacking direction, and the method including the steps of disposing at least two positioning pins at the end of the stack case, inserting the at least two positioning pins respectively into at least two positioning holes provided in the end plate, and fixing the end plate to the stack case in a state where the stack case and the end plate are positioned by the at least two positioning pins and the tightening load is applied to the cell stack body.

In the fuel cell stack and a method of assembling the fuel cell stack, at the time of assembling the stack case and the end plate, the stack case and the end plate can be positioned using at least the two positioning pins. Therefore, it is possible to easily perform operation of fixing the end plate.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a second cross sectional view showing the method of assembling the fuel cell stack (first embodiment);

FIG. 8A is a first cross sectional view showing a method of assembling the fuel cell stack (fifth embodiment);

FIG. 8B is a second cross sectional view showing the method of assembling the fuel cell stack (fifth embodiment);

FIG. 8C is a third cross sectional view showing the method of assembling the fuel cell stack (fifth embodiment);

DESCRIPTION OF THE PREFERRED EMBODIMENTS

Figure 1:
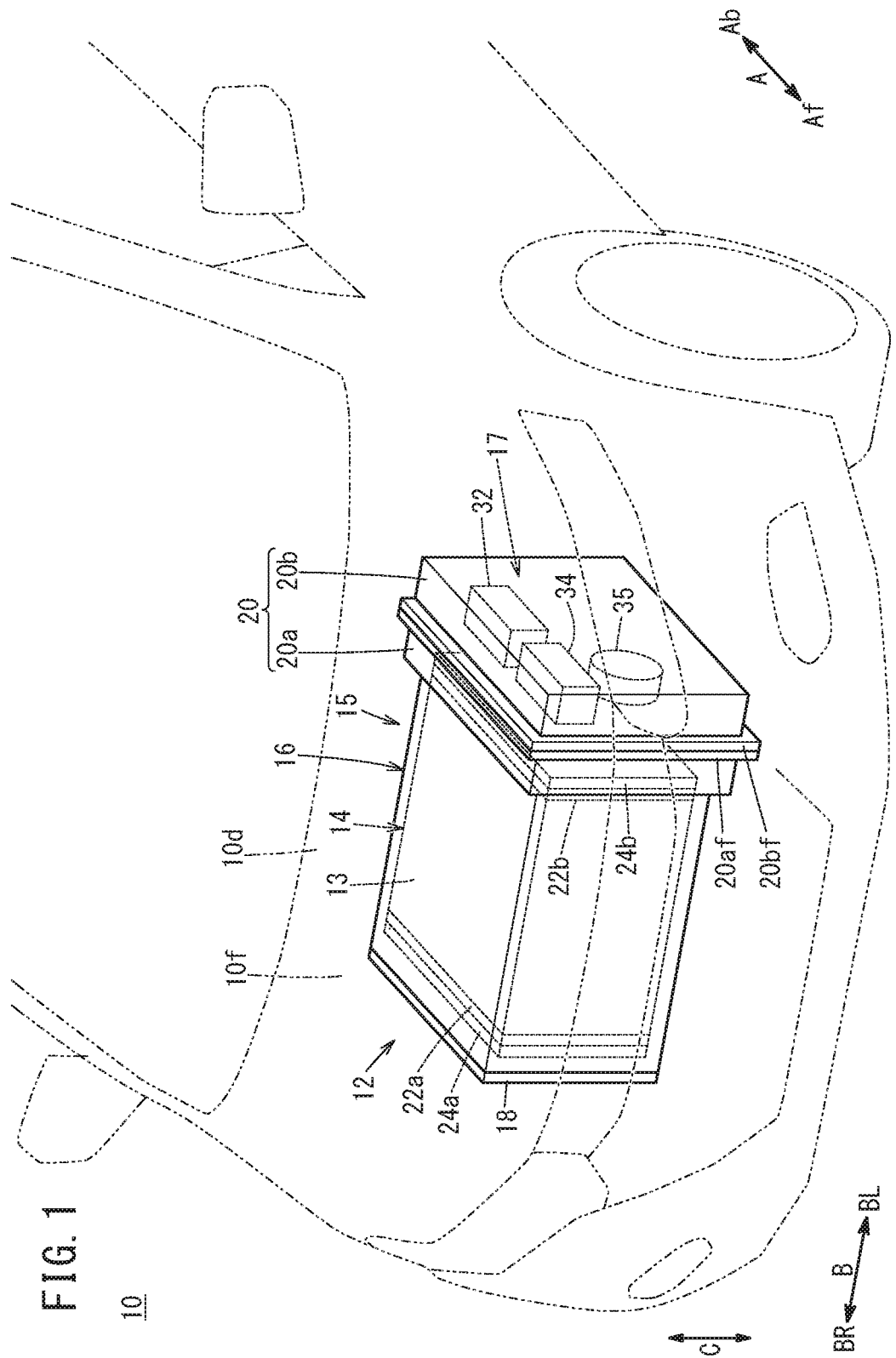
FIG. 1 is a perspective view showing a front part of a fuel cell vehicle equipped with a fuel cell stack according to an embodiment of the present invention.

In the following description, the upper side (upper part) means the upper side (upper part) in the vertical direction. The lower side (lower part) means the lower side (lower part) in the vertical direction. As shown in FIG. 1, a fuel cell stack 12 according to an embodiment of the present invention is mounted in a fuel cell vehicle 10. For example, the fuel cell vehicle 10 is a fuel cell electric automobile. Further, the fuel cell vehicle 10 includes electric equipment such as an ECU (Electronic control unit) and a traction motor which is operated using electrical energy generated in the fuel cell stack 12 as a power source.

The fuel cell stack 12 is placed in a front room (motor room) 10f formed on a front side of a dashboard 10d (in a direction indicated by an arrow Af). The fuel cell stack 12 includes a cell stack body 14 formed by stacking a plurality of power generation cells 13 in one direction, and a stack case 16 covering the cell stack body 14. Further, the fuel cell stack 12 includes an auxiliary device case 20 containing fuel cell auxiliary devices 17.

Each of the power generation cells 13 includes a membrane electrode assembly formed by providing an anode and a cathode on both surfaces of an electrolyte membrane (e.g., solid polymer electrolyte membrane), respectively, and a pair of separators sandwiching the membrane electrode assembly from both sides. A fuel gas flow field is formed between the anode and one of the separators, and an oxygen-containing gas flow field is formed between the cathode and the other of the separators.

The cell stack body 14 has a fuel gas supply passage for supplying a fuel gas to a fuel gas flow field, a fuel gas discharge passage for discharging a fuel gas, an oxygen-containing gas supply passage for supplying an oxygen-containing gas to an oxygen-containing flow field, an oxygen-containing gas discharge passage for discharging the oxygen-containing gas, a coolant supply passage for supplying a coolant, and a coolant discharge passage for discharging the coolant. The fuel gas supply passage, the fuel gas discharge passage, the oxygen-containing gas supply passage, the oxygen-containing gas discharge passage, the coolant supply passage, and the coolant discharge passage extend through the cell stack body 14 in the stacking direction.

In FIG. 1, the stacking direction of the plurality of power generation cells 13 (direction indicated by an arrow S in FIG. 2) is aligned with the vehicle width direction (direction indicated by an arrow B). Alternatively, the plurality of power generation cells 13 may be stacked together in the vertical direction (direction indicated by an arrow C). The plurality of power generation cells 13 may be stacked together in a vehicle front/rear direction (direction indicated by an arrow A). A first terminal plate 22a is provided at one end of the cell stack body 14 in the stacking direction (direction indicated by an arrow BR), and a first insulating plate 24a is provided outside the first terminal plate 22a. A second terminal plate 22b is provided at the other end of the cell stack body 14 in the stacking direction (direction indicated by an arrow BL), and a second insulating plate 24b is provided outside the second terminal plate 22b.

The stack case 16 has a substantially rectangular shape in a plan view (rectangular shape having long sides extending in the vehicle width direction). The stack case 16 has a cubic shape or a rectangular parallelepiped shape. The stack case 16 includes a rectangular first opening 16p (see FIG. 2) formed on the right side (in the direction indicated by the arrow BR), and a rectangular second opening 16s (see FIG. 2) formed on the left side (in the direction indicated by the arrow BL), and has a box shape.

An end plate 18 is fixed (tightened using a plurality of bolts 38 (see FIG. 2)) to one end 16e (end surface) of the stack case 16 in a manner that the first opening 16p of the stack case 16 is closed by the end plate 18. The end plate 18 applies a tightening load to the cell stack body 14 in the stacking direction. Though not shown, a seal member made of elastic material is provided between the stack case 16 and the end plate 18, over the entire periphery of the joint surfaces of the stack case 16 and the end plate 18.

The auxiliary device case 20 is a protection case for protecting the fuel cell auxiliary devices 17. The auxiliary device case 20 is provided adjacent to the stack case 16 in the horizontal direction, and is joined to the stack case 16. Fuel gas system devices and oxygen-containing gas system devices are stored as the fuel cell auxiliary devices 17, in the auxiliary device case 20. The fuel gas system devices stored in the auxiliary device case 20 are an injector 32, an ejector 34, a hydrogen pump 35, and valves (not shown), etc. The auxiliary device case 20 includes a first case member 20a having a recessed shape provided adjacent to the stack case 16, and a second case member 20b having a recessed shape joined to the first case member 20a. The fuel cell auxiliary devices 17 are at least partially stored in the first case member 20a.

The first case member 20a is joined to the left end of the stack case 16 using bolts. The first case member 20a also serves as the other end plate which contacts the second insulating plate 24b to apply a tightening load to the cell stack body 14 in the stacking direction. Though not shown, a seal member made of elastic material is provided between a case body 76 and the first case member 20a, over the entire periphery of the joint surfaces of the stack case 16 and the first case member 20a.

The second case member 20b is a cover member closing the opening of the first case member 20a, and is joined to the first case member 20a using bolts (not shown). Though not shown, a seal member made of elastic material is provided between a first flange 20af of the first case member 20a and a second flange 20bf of the second case member 20b, over the entire periphery of joint surfaces of the first case member 20a and the second case member 20b.

A ventilation duct (not shown) is connected to an upper part of a case unit 15 made up of the stack case 16, the end plate 18, and the auxiliary device case 20. When the fuel gas is leaked out from the fuel cell stack 12 or the fuel cell auxiliary devices 17, the fuel gas is discharged to the outside of the vehicle through the ventilation duct.

Next, a method of assembling the fuel cell stack 12 having the above structure will be described.

Figure 2:
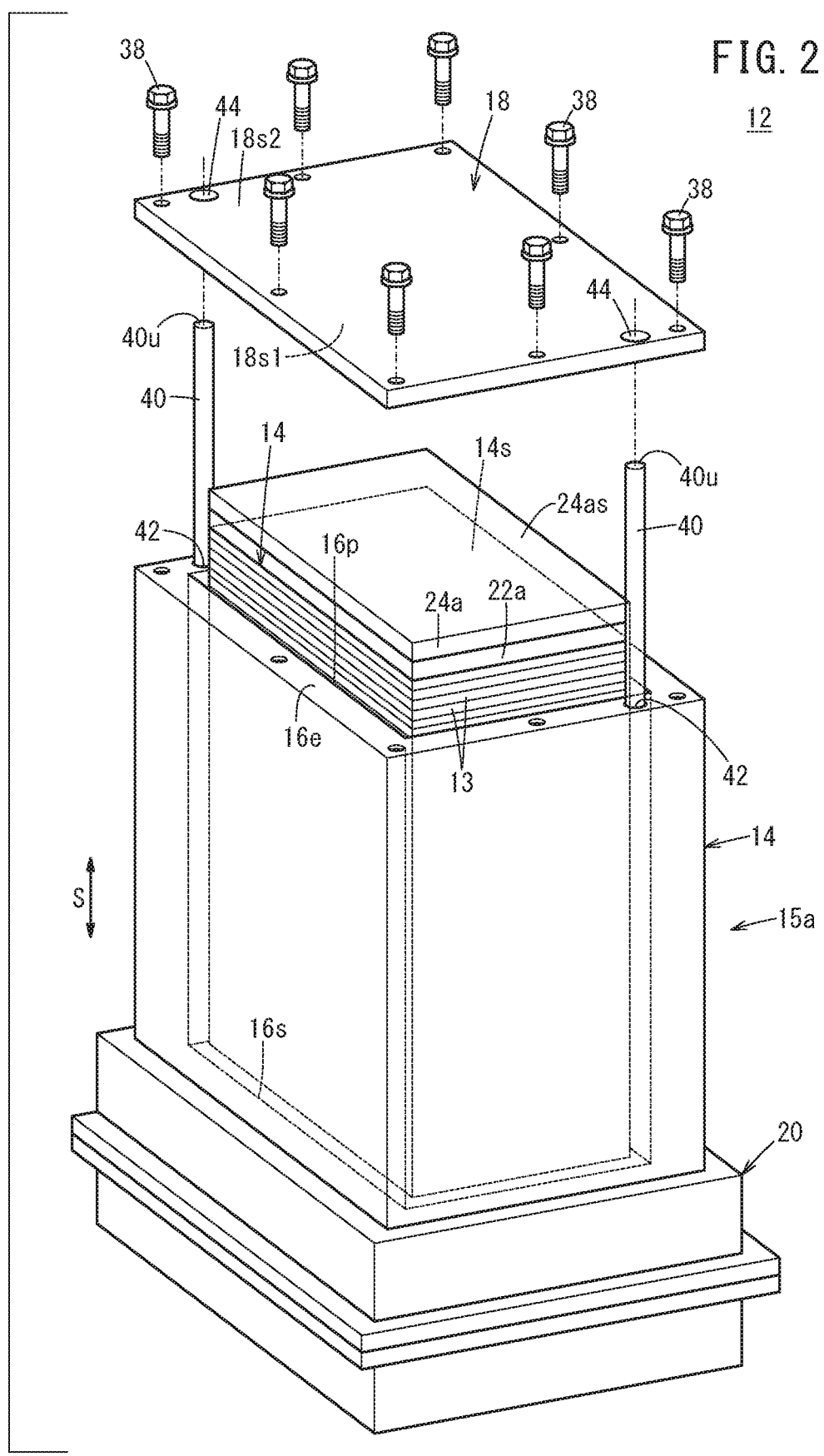
FIG. 2 is a perspective view showing a method of assembling the fuel cell stack (first embodiment)

In the method of assembling the fuel cell stack 12, as shown in FIG. 2, at least two positioning pins 40 are used. Specifically, the method of assembling the fuel cell stack 12 includes disposing the positioning pins 40 at an end 16e of the stack case 16 (pin disposing step), placing the end plate 18 on the cell stack body 14 while inserting the positioning pins 40 into positioning holes 44 formed in the end plate 18 (plate placing step), pressing the end plate 18 to apply a tightening load (compression load) to the cell stack body 14 (pressure applying step), and fixing the end plate 18 to the stack case 16 (fixing step).

In FIG. 2, a case structure body 15a formed by joining the stack case 16 and the auxiliary device case 20 together is provided in a state where the first opening 16p of the stack case 16 is oriented upward. Further, the cell stack body 14 to which the tightening load has not been applied is disposed in the stack case 16. Part of the cell stack body 14 to which the tightening load has not been applied (part including the upper end of the cell stack body 14, the stacking direction of which is oriented in the vertical direction) protrudes toward the outside of the stack case 16 (upward) through the first opening 16p of the stack case 16.

At least two recesses 42 are provided at the end 16e (end surface) of the stack case 16. Each of the recesses 42 holds one end of each of the positioning pins 40 which position the stack case 16 and the end plate 18. Each of the recesses 42 is a hole with a bottom, and has the depth in the stacking direction (direction indicated by the arrow S) of the cell stack body 14. Each of the recesses 42 is a circular hole in a plan view (viewed in the direction indicated by the arrow S). In the embodiment of the present invention, the recesses 42 are respectively provided in two opposing sides of the rectangular end 16e of the stack case 16. The two recesses 42 are provided adjacent to diagonal positions of the end 16e.

In the pin disposing step, at least two positioning pins 40 are disposed at the end 16e (end surface) of the stack case 16. Specifically, one end of the positioning pin 40 is inserted into each of the recesses 42 provided at the end 16e of the stack case 16. Each of the positioning pins 40 has an elongated columnar shape. In the state where the positioning pins 40 are inserted into the recesses 42, the positioning pins 40 are disposed substantially in parallel with the stacking direction (indicated by the arrow S) of the cell stack body 14, and the other end (an upper end 40u) of each of the positioning pins 40 is higher than an end surface 14s of the cell stack body 14 and an end surface 24as of the first insulating plate 24a.

Figure 3:
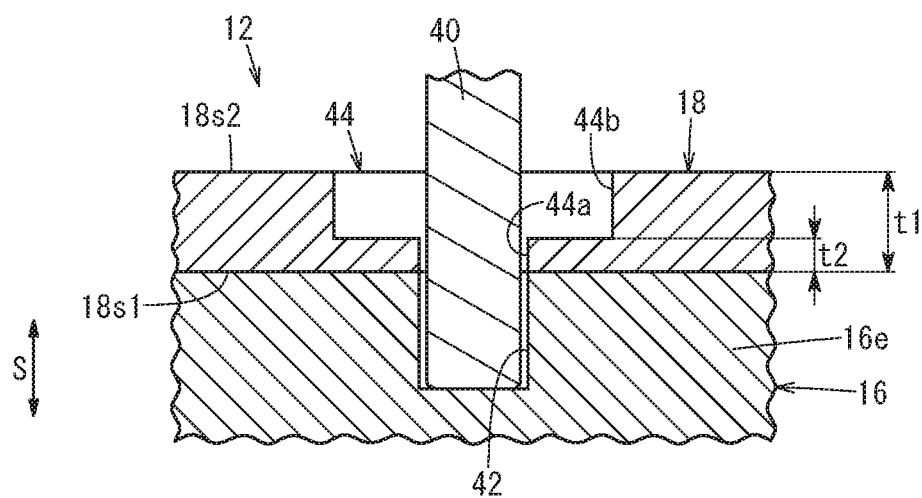
FIG. 3 is a first cross sectional view showing the method of assembling the fuel cell stack (first embodiment)

At least two positioning holes 44 for inserting the positioning pins 40 thereinto are provided in the end plate 18, facing (coaxially with) the at least two recesses 42. As shown in FIG. 3, the positioning hole 44 penetrates through the end plate 18 in the thickness direction. That is, the positioning hole 44 is a through hole opened to a surface (inner surface 18s1) of the end plate 18 on a side closer to the stack case 16, and opened to a surface (outer surface 18s2) opposite to the stack case 16. The positioning hole 44 has a circular shape in a plan view (viewed in the direction indicated by the arrow S). The inner diameter of the positioning hole 44 on a side closer to the stack case 16 is smaller than the inner diameter of the positioning hole 44 on a side opposite to the stack case 16. Hereinafter, a portion of the positioning hole 44 that is on a side closer to the stack case 16 and has a relatively small diameter will be referred to as a small diameter portion 44a, and a portion of the positioning hole 44 that is on a side opposite to the stack case 16 and has a relatively large diameter will be referred to as a large diameter portion 44b.

The small diameter portion 44a and the large diameter portion 44b are provided coaxially. The inner diameter of the small diameter portion 44a is set to be substantially the same as the inner diameter of the recess 42. In order to obtain the high positional accuracy, the inner diameter of the recess 42 and the inner diameter of the small diameter portion 44a are set to be substantially the same as, or to be slightly larger than the outer diameter of the positioning pin 40. The inner diameter of the large diameter portion 44b is set to be larger than the inner diameter of the recess 42 in a manner that the inner circumferential portion of the large diameter portion 44b does not contact the positioning pin 40 even if the end plate 18 is bent at the time of assembling. Preferably, a thickness t2 of the small diameter portion 44a (length in the axial direction) is not more than the half of a thickness t1 of the end plate 18.

In FIG. 2, after the pin disposing step, the plate placing step of placing the end plate 18 on the cell stack body 14 is performed. In the plate placing step, the end plate 18 is positioned to face the cell stack body 14, above (immediately above) the cell stack body 14 to which the stacking load has not been applied and which is partially stored in the stack case 16. Then, the end plate 18 is lowered toward the stack case 16 and the cell stack body 14, the positioning pins 40 are inserted into the positioning holes 44 provided in the end plate 18, and the end plate 18 is placed on the cell stack body 14. At this time, since the positioning pins 40 serve as guides, it is possible to place the end plate 18 on the cell stack body 14 with a higher degree of positional accuracy.

After the plate placing step, the pressure applying step of applying the tightening load to the cell stack body 14 is performed. In the pressure applying step, using a press machine (not shown), the end plate 18 is pressed downward (toward the cell stack body 14). Then, the end plate 18 is pressed downward by the press machine, and as shown in FIG. 3, the end plate 18 is brought into contact with the end 16e of the stack case 16. In this state, the end plate 18 is positioned accurately with respect to the stack case 16 by the positioning pins 40.

In FIG. 2, in the period from the time when the press machine starts to press the end plate 18 until the end plate 18 contacts the end 16e of the stack case 16, the cell stack body 14 is compressed in the stacking direction (direction indicated by the arrow S) between the end plate 18 and the first case member 20a (the other end plate), and the entire length (length in the stacking direction) of the cell stack body 14 is reduced.

After the pressure applying step, the fixing step of fixing the end plate 18 to the stack case 16 is performed. In the fixing step, in the state where the press machine presses the end plate 18, and the end plate 18 is in contact with the end 16e of the stack case 16, the end plate 18 is tightened to the stack case 16 by the plurality of bolts 38. After the end plate 18 is fixed to the stack case 16 as described above, the positioning pins 40 are pulled out of the recesses 42 and the positioning holes 44 as shown in FIG. 4. It should be noted that the end plate 18 may be fixed to the stack case 16 by welding, crimping, or the like, instead of using the bolts 38. A shim plate for adjusting the tightening load may be inserted between one of the end plates (the end plate 18 or the first case member 20a) and the cell stack body 14.

In this case, the fuel cell stack 12 and the method of assembling the fuel cell stack 12 offer the following advantages.

As shown in FIG. 2, in the fuel cell stack 12, at least two recesses 42 are provided at the end 16e of the stack case 16. Each of the at least two recesses 42 holds one end of each of the positioning pins 40 which position the stack case 16 and the end plate 18. At least two positioning holes 44, into which the positioning pins 40 are inserted, are provided in the end plate 18, correspondingly to the at least two recesses 42. In the structure, at the time of assembling the stack case 16 and the end plate 18 together, the stack case 16 and the end plate 18 are positioned accurately using the at least two positioning pins 40. Therefore, it is possible to easily perform operation of fixing the end plate 18.

The stack case 16 has a cubic shape or a rectangular parallelepiped shape, and the recesses 42 are respectively provided in the two opposing sides of the end 16e. In the structure, it is possible to accurately position the stack case 16 and the end plate 18.

As shown in FIG. 3, the inner diameter of the positioning hole 44 on the side closer to the stack case 16 is smaller than the inner diameter of the positioning hole 44 on the side opposite to the stack case 16. In the structure, even if the end plate 18 is deformed (slightly curved) by the tightening load, the positioning pin 40 contacts the positioning hole 44 in part of the end plate 18 in the thickness direction. Therefore, the contact area between the inner circumferential surface of the positioning hole 44 and the outer circumferential surface of the positioning pin 40 becomes small.

Specifically, even if the end plate 18 is deformed by the tightening load, only the inner circumferential surface of the small diameter portion 44a of the positioning hole 44 contacts the positioning pin 40, and the large diameter portion 44b of the positioning hole 44 does not contact the positioning pin 40. Therefore, the contact area between the positioning hole 44 and the positioning pin 40 is small. As a result, after the end plate 18 is fixed, the positioning pin 40 can be pulled out of the end plate 18 (positioning hole 44) easily. Accordingly, it is possible to smoothly perform operation of fixing the end plate 18 to the stack case 16, and more easily perform operation of fixing the end plate 18.

Alternatively, conversely to the above structure, the small diameter portion 44a may be provided on the end plate 18 on the outer surface 18s2 side, and the large diameter portion 44b may be provided on the end plate 18 on the inner surface 18s1 side. Further, alternatively, the small diameter portions 44a may be provided on the end plate 18 on the inner surface 18s1 side and on the outer surface 18s2 side, respectively, and the large diameter portion 44b may be provided between the two small diameter portions 44a (intermediate position of the end plate 18 in the thickness direction). Also in the structure, even if the end plate 18 is deformed by the tightening load, only the inner circumferential surface of the small diameter portion 44a of the positioning hole 44 contacts the positioning pin 40, and thus, the contact area is reduced. Therefore, it is possible to easily pull out the positioning pin 40 after fixing the end plate 18. As described above, the small diameter portion 44a should be provided in part of the thickness of the end plate 18.

Figure 5A:
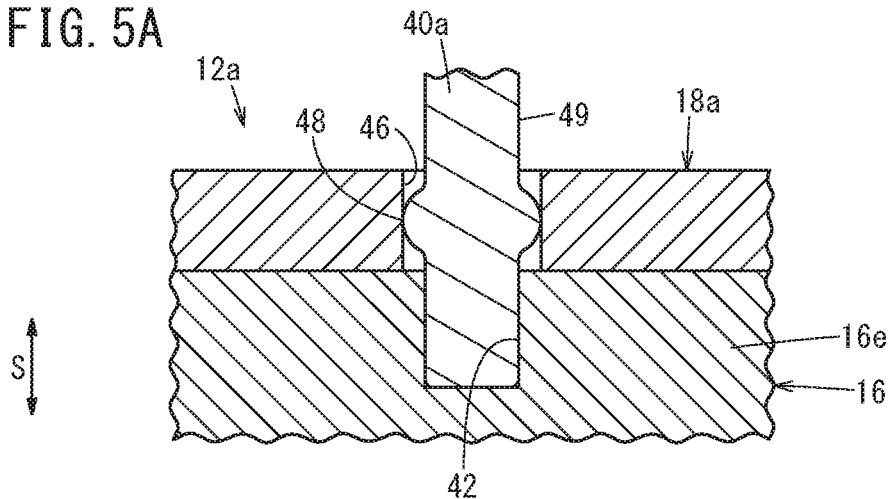
FIGS. 5A, 5B and 5C are cross sectional views showing a method of assembling the fuel cell stack (second embodiment)

With reference to FIG. 5A, as a second embodiment, a method of assembling a fuel cell stack 12a using positioning pins 40a will be described. At least two positioning holes 46, into which the positioning pins 40a are inserted, are provided in an end plate 18a, facing the at least two recesses 42 provided in the stack case 16. The end plate 18a has the same structure as the end plate 18 (see FIGS. 1 to 3) except that the positioning holes 46 are provided instead of the positioning holes 44.

The inner diameter of the positioning hole 46 is constant over the axial direction (thickness direction of the end plate 18a). The positioning pin 40a includes an expansion section 48 expanding in the radial direction in part of the positioning pin 40a in the axial direction (a portion inserted into the positioning hole 46). The outer diameter of the expansion section 48 is larger than the outer diameter of the remaining portion (a pin shaft portion 49) of the positioning pin 40a. The expansion section 48 is an annular projection extending over the entire circumference of the outer circumferential portion of the positioning pin 40a. The profile of the expansion section 48 in cross section along the axis of the positioning pin 40a has an arc shape (preferably, circular arc shape).

In the case where the end plate 18a is deformed by the tightening load, only the expansion section 48 of the positioning pin 40a contacts the positioning hole 46. The method of assembling the fuel cell stack 12a is the same as the method of assembling the fuel cell stack 12, except that the positioning pins 40a each having the expansion section 48 is used. That is, as in the case of the method of assembling the fuel cell stack 12, the method of assembling the fuel cell stack 12a includes the pin disposing step, the plate placing step, the pressure applying step, and the fixing step.

In the method of assembling the fuel cell stack 12a, at the time of assembling the stack case 16 and the end plate 18a, the stack case 16 and the end plate 18a can be positioned using the at least two positioning pins 40a. Therefore, it is possible to easily perform operation of fixing the end plate 18a. Further, at the time of fixing the end plate 18a to the stack case 16, even if the end plate 18a is deformed by the tightening load, only the expansion section 48 of the positioning pin 40a contacts the inner circumferential surface of the positioning hole 46, and the remaining portion (pin shaft portion 49) of the positioning pin 40a does not contact the inner circumferential surface of the positioning hole 46. Therefore, the contact area between the positioning hole 46 and the positioning pin 40a is small. Accordingly, after fixing the end plate 18a, it is possible to easily pull out the positioning pin 40a from the end plate 18a (positioning hole 46).

Figure 5B:
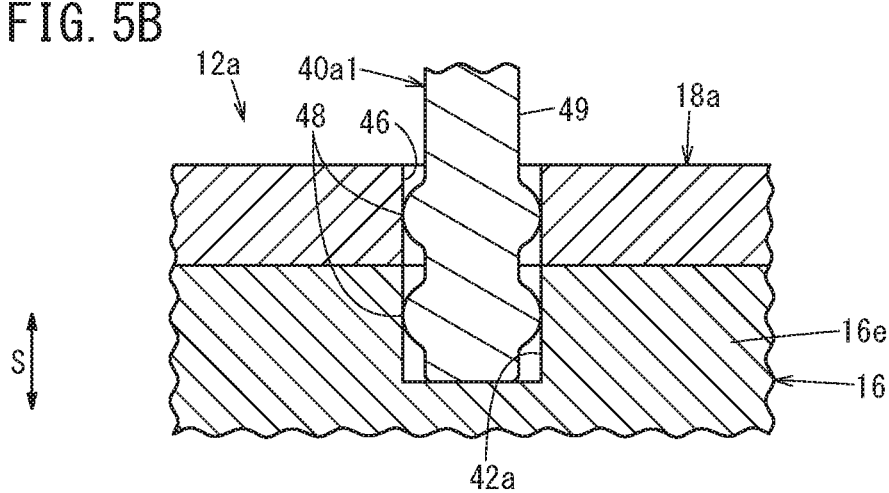

Instead of the positioning pin 40a shown in FIG. 5A, a positioning pin 40a1 shown in FIG. 5B may be used. The positioning pin 40a1 includes two expansion sections 48 arranged in the axial direction. In the pin disposing step, one of the expansion sections 48 (on the front side) is inserted into a recess 42a having a larger diameter than the recess 42 (FIG. 5A). The outer diameters of the two expansion sections 48 may be the same, or may be different from each other. The magnitude relationship between the inner diameter of the recess 42a and the inner diameter of the positioning hole 46 is determined in accordance with the magnitude relationship between the outer diameters of the two expansion sections 48.

Figure 5C:
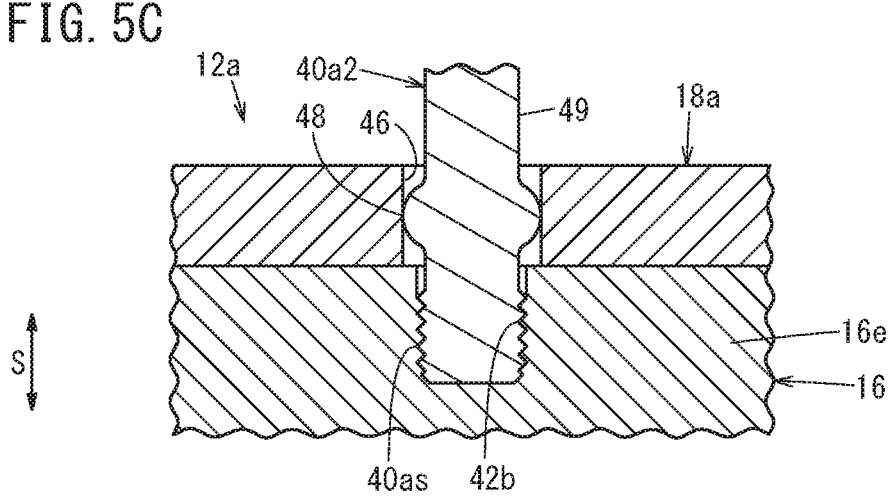

Instead of the positioning pin 40a shown in FIG. 5A, a positioning pin 40a2 shown in FIG. 5C may be used. A male screw 40as is provided at the front end of the positioning pin 40a2. In the pin disposing step, the male screw 40as of the positioning pin 40a2 is inserted into (screwed with) a recess 42b formed as a female screw.

Figure 6A:
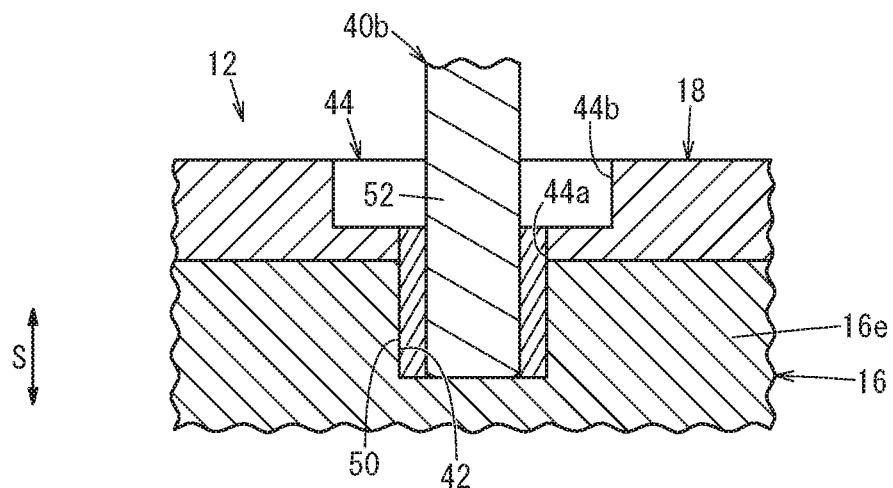
FIG. 6A is a first cross sectional view showing a method of assembling the fuel cell stack (third embodiment)
Figure 6B:
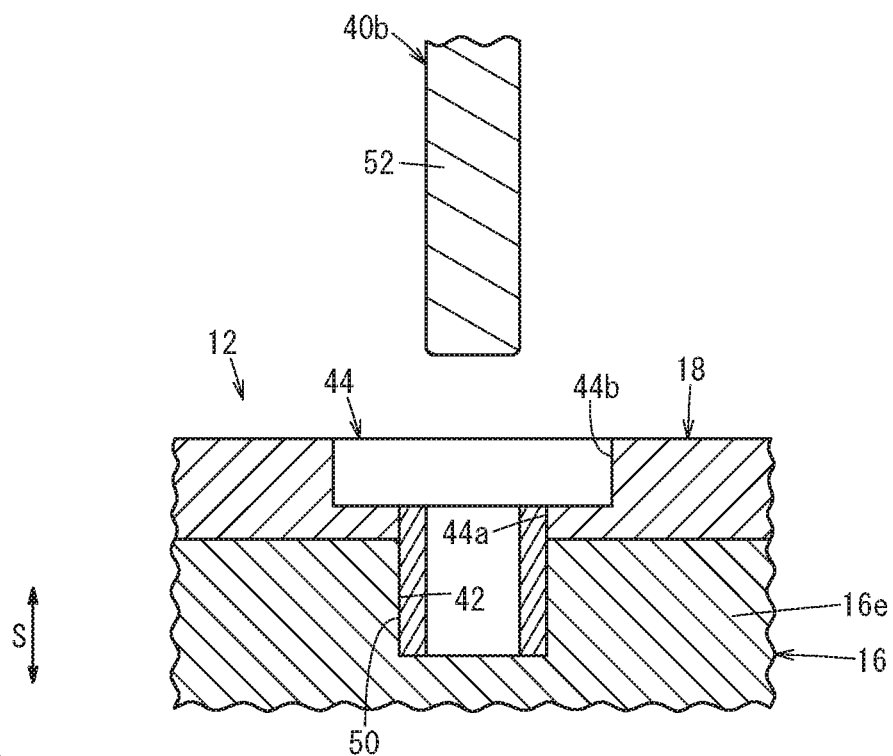
FIG. 6B is a second cross view showing the method of assembling the fuel cell stack (third embodiment)

With reference to FIGS. 6A and 6B, as a third embodiment, a method of assembling the fuel cell stack 12 using positioning pins 40b will be described. In assembling the fuel cell stack 12, at the time of fixing the end plate 18 to the stack case 16, at least two positioning pins 40b are used. As shown in FIG. 6A, each of the positioning pins 40b includes a first member 50 having a hollow ring shape, and a second member 52 which protrudes from the first member 50, and which is detachable from the first member 50. The first member 50 has a circular ring shape. The first member 50 may have a polygonal ring shape (e.g., hexagonal ring shape). In the case where the first member 50 has a polygonal ring shape, the inner circumferential shape of the recess 42 has a polygonal ring shape as well. The length of the first member 50 is not less than a length corresponding to the total of the depth of the recess 42 and the thickness of the small diameter portion 44a. That is, the length of the first member 50 is set in a manner that, when the first member 50 is inserted into the recess 42, the first member 50 is disposed also in the small diameter portion 44a of the positioning hole 44.

The outer diameter of the second member 52 is smaller than the outer diameter of the first member 50. The second member 52 is an elongated rod member forming a pin main body. The second member 52 has the same length as the positioning pin 40 (FIG. 2).

The method of assembling the fuel cell stack 12 using the positioning pin 40b includes disposing the at least two positioning pins 40b at the end 16e of the stack case 16 (pin disposing step), placing the end plate 18 on the cell stack body 14 (plate placing step), pressing the end plate 18 to apply a tightening load to the cell stack body 14 (FIG. 2) (pressure applying step), and fixing the end plate 18 to the stack case 16 (fixing step).

In this case, in the pin disposing step, the first member 50 is disposed in the positioning hole 44 and the recess 42, and the second member 52 is inserted into the first member 50. The plate placing step, the pressure applying step, and the fixing step are performed in the same manner as in the assembling method using the positioning pin 40 (see FIGS. 2 to 4). After the fixing step, the second member 52 is pulled out of the first member 50 as shown in FIG. 6B. In the state where the end plate 18 is deformed by the tightening load, the first member 50 is fitted to the positioning hole 44, and therefore, the first member 50 remains held in the recess 42 and the positioning hole 44 (remains on the fuel cell stack 12 side).

In the method of assembling the fuel cell stack 12 using the positioning pins 40b, at the time of assembling the stack case 16 and the end plate 18, the stack case 16 and the end plate 18 can be positioned using the at least two positioning pins 40b. Therefore, it is possible to easily perform operation of fixing the end plate 18. Further, by rough guiding (rough positional alignment) at the time of assembling using the second member 52 having the relatively small diameter, it is possible to accurately position the stack case 16 and the end plate 18 by the first member 50 having the relatively large diameter. Further, even if the end plate 18 is deformed by the tightening load, it is possible to easily pull out the second member 52 after fixing the end plate 18. Therefore, it is possible to easily perform operation of fixing the end plate 18.

Figure 7A:
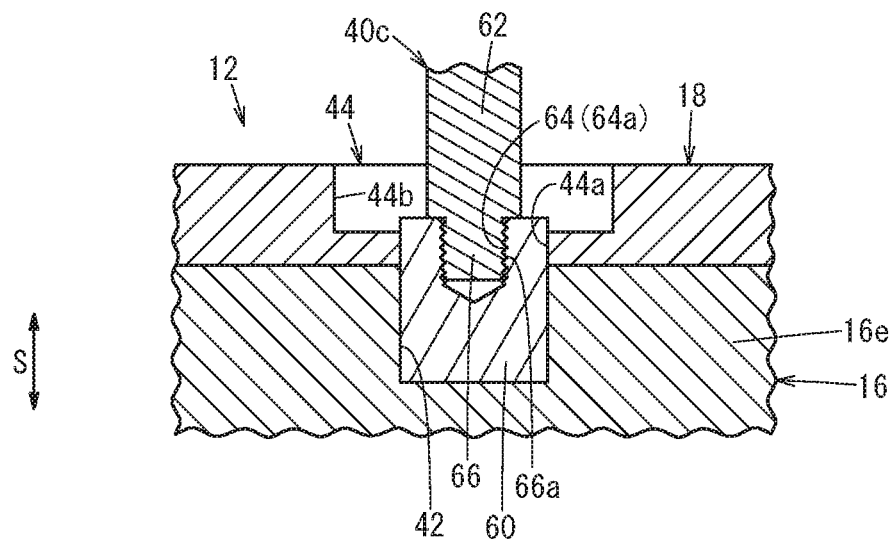
FIG. 7A is a first cross sectional view showing a method of assembling the fuel cell stack (fourth embodiment)
Figure 7B:
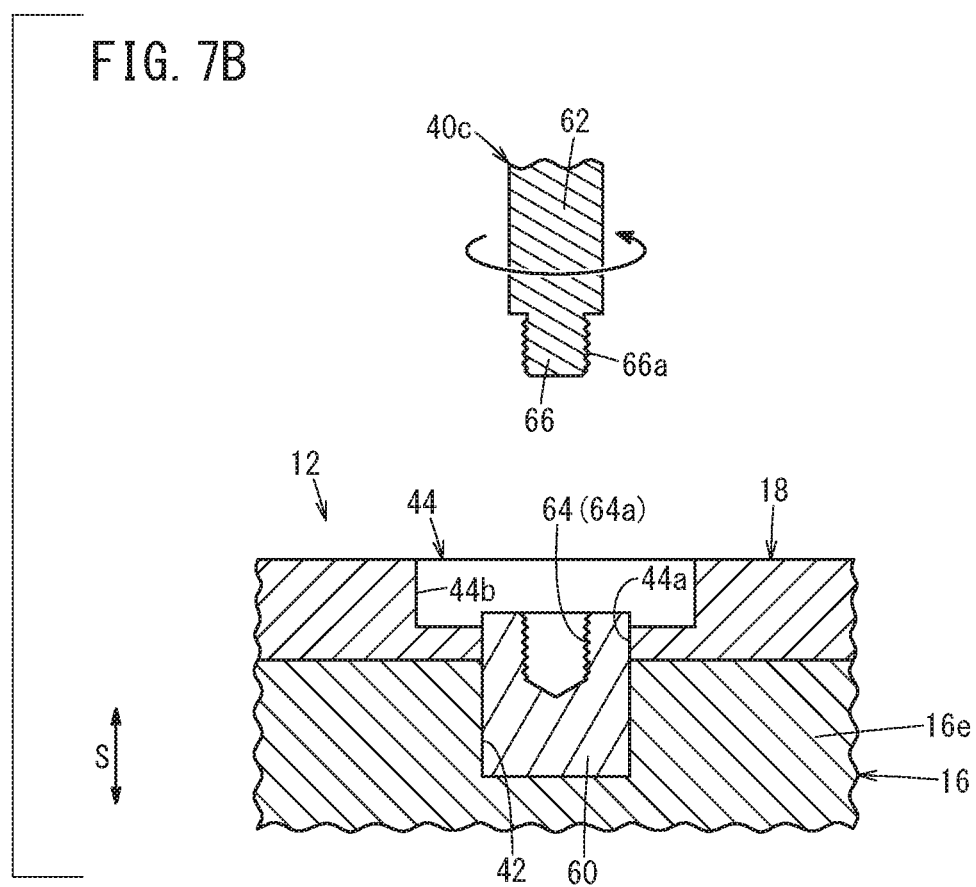
FIG. 7B is a second cross sectional view showing the method of assembling the fuel cell stack (fourth embodiment)

With reference to FIGS. 7A and 7B, as a fourth embodiment, a method of assembling the fuel cell stack 12 using positioning pins 40c will be described. In the assembling method, at the time of fixing the end plate 18 to the stack case 16, at least two positioning pins 40c are used. As shown in FIG. 7A, each of the positioning pins 40c includes a first member 60, and a second member 62 which protrudes from the first member 60, and which is screwed with the first member 60.

The first member 60 has a cylindrical shape (columnar shape). The first member 60 may have a polygonal tube shape (e.g. hexagonal tube shape). In the case where the first member 60 has a polygonal tube shape, the inner circumferential shape of the recess 42 has a polygonal tube shape as well. The length of the first member 60 is not less than a length corresponding to the total of the depth of the recess 42 and the thickness of the small diameter portion 44a. That is, the length of the first member 60 is set in a manner that, when the first member 60 is inserted into the recess 42, the first member 60 is disposed also in the small diameter portion 44a of the positioning hole 44. A screw hole 64 having a female screw 64a is provided at an end of the first member 60.

The outer diameter of the second member 62 is smaller than the outer diameter of the first member 60. The second member 62 is an elongated rod member forming a pin main body. A screw projection 66 having a male screw 66a is provided at an end of the second member 62. In FIG. 7A, the male screw 66a is screwed with the female screw 64a, whereby the first member 60 and the second member 62 are joined together. In the state where the first member 60 and the second member 62 are joined together, the positioning pin 40c has the same length as the positioning pin 40 (FIG. 2).

The method of assembling the fuel cell stack 12 using the positioning pins 40c includes disposing the at least two positioning pins 40c at the end 16e of the stack case 16 (pin disposing step), placing the end plate 18 on the cell stack body 14 (plate placing step), pressing the end plate 18 to apply the tightening load to the cell stack body 14 (pressure applying step), and fixing the end plate 18 to the stack case 16 (fixing step). In this case, in the pin disposing step, in the state where the first member 60 and the second member 62 are joined together, the first member 60 is disposed in the positioning hole 44 and the recess 42. The plate placing step, the pressure applying step, and the fixing step are performed in the same manner as in the assembling method using the positioning pins 40 (FIGS. 2 to 4).

After the fixing step, as shown in FIG. 7B, the second member 62 is rotated to remove the second member 62 from the first member 60 (release screw engagement between the first member 60 and the second member 62), and the first member 60 is pulled out of the positioning hole 44. In the state where the end plate 18 is deformed by the tightening load, the first member 60 is fitted to the positioning hole 44, and therefore, the first member 60 remains held in the recess 42 and the positioning hole 44 (remains on the fuel cell stack 12 side).

In the method of assembling the fuel cell stack 12 using the positioning pins 40c, at the time of assembling the stack case 16 and the end plate 18, the stack case 16 and the end plate 18 can be positioned using the at least two positioning pins 40c. Therefore, it is possible to easily perform operation of fixing the end plate 18. Further, by rough guiding at the time of assembling using the second member 62 having the relatively small diameter, it is possible to accurately position the stack case 16 and the end plate 18 by the first member 60 having the relatively large diameter. Further, even if the end plate 18 is deformed by the tightening load, it is possible to easily pull out the second member 62 after fixing the end plate 18. Therefore, it is possible to easily perform operation of fixing the end plate 18.

With reference to FIGS. 8A and 8B, as a fifth embodiment, a method of assembling a fuel cell stack 12b using positioning pins 40d will be described. At the time of fixing the end plate 18 to a stack case 16a, at least two positioning pins 40d are used. Recesses 68 each having a female screw 68a are provided at an end 16e of the stack case 16a. The stack case 16a has the same structure as the stack case 16 (FIGS. 1 to 3) except that the recesses 68 are provided instead of the recesses 42. The inner diameter of the recess 68 is smaller than the inner diameter of the small diameter portion 44a of the positioning hole 44. The recess 68 and the positioning hole 44 are disposed coaxially. A screw projection 69 having a male screw 69a is provided at an end of the positioning pin 40d.

The method of assembling the fuel cell stack 12b using the positioning pins 40d includes disposing the at least two positioning pins 40d at the end 16e of the stack case 16a (pin disposing step), placing the end plate 18 on the cell stack body 14 (FIG. 2) (plate placing step), pressing the end plate 18 to apply the tightening load to the cell stack body 14 (pressure applying step), and fixing the end plate 18 to the stack case 16a (fixing step). In this case, in the pin disposing step, the male screw 69a of the screw projection 69 of the positioning pin 40d is screwed with the female screw 68a of the stack case 16a.

Then, in the plate placing step, the end plate 18 is lowered, and using the positioning pins 40d as guide members, the end plate 18 is placed on the cell stack body 14 (FIG. 2). In the pressure applying step, using a press machine (not shown), the end plate 18 is pressed down until the end plate 18 is brought into contact with the end 16e of the stack case 16a as shown in FIG. 8A. In the fixing step, while the positioning pin 40d remains attached to the stack case 16a, the end plate 18 is tightened to the stack case 16a. After the fixing step, the positioning pin 40d is rotated to release screw engagement between the male screw 69a and the female screw 68a, and as shown in FIG. 8B, the positioning pin 40d is removed from the stack case 16a.

In the method of assembling the fuel cell stack 12b using the positioning pins 40d, at the time of assembling the stack case 16a and the end plate 18, the stack case 16a and the end plate 18 can be positioned using the at least two positioning pins 40d. Therefore, it is possible to easily perform operation of fixing the end plate 18. Further, even if the end plate 18 is deformed by the tightening load, it is possible to easily remove the positioning pins 40d after fixing the end plate 18. Further, since the positioning pins 40d are attached to the stack case 16a by screw engagement, it is possible to attach the positioning pins 40d to the stack case 16a with a suitable joining force.

As shown in FIG. 8C, the recess 68 may include, in addition to the female screw 68a, a non-threaded fitting portion 68b having a diameter larger than that of the female screw 68a. The fitting portion 68b is provided in an area, of the recess 68, which is shallower than the female screw 68a (closer to the end plate 18). In the pin disposing step, a shoulder portion 40ds of the positioning pin 40d is inserted into the fitting portion 68b. By providing the fitting portion 68b, positioning can be made more accurately.

Figure 9A:
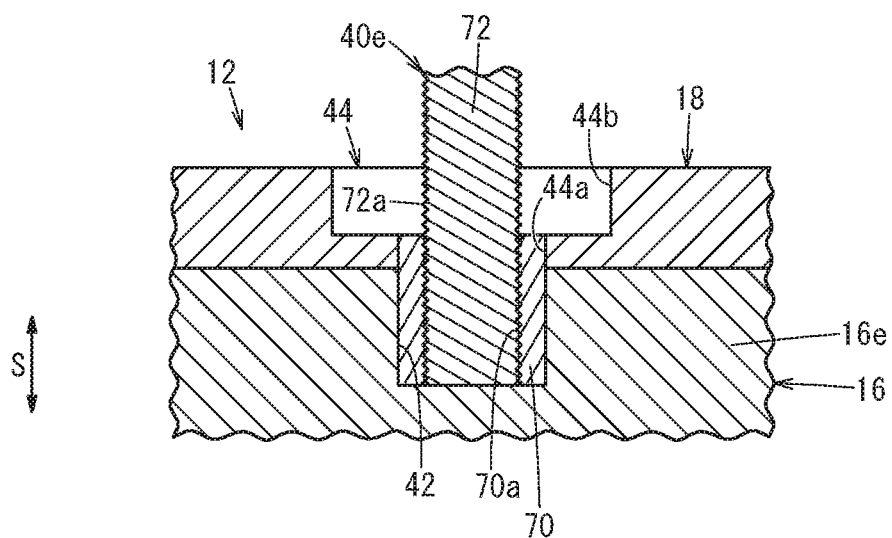
FIG. 9A is a first cross sectional view showing a method of assembling the fuel cell stack (sixth embodiment)
Figure 9B:
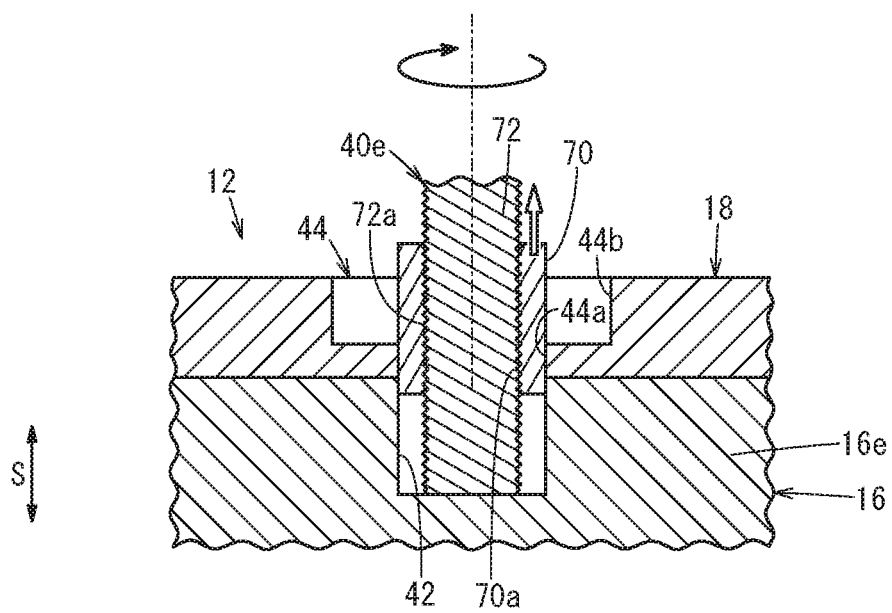
FIG. 9B is a second cross sectional view showing the method of assembling the fuel cell stack (sixth embodiment).

With reference to FIGS. 9A and 9B, as a sixth embodiment, a method of assembling the fuel cell stack 12 using positioning pins 40e will be described. At the time of fixing the end plate 18 to the stack case 16, at least two positioning pins 40e are used. As shown in FIG. 9A, each of the positioning pins 40e includes a hollow cylindrical first member 70 having a female screw 70a, and a second member 72 which protrudes from the first member 70, and which is screwed with the first member 70.

The outer circumferential shape of the first member 70 is a circular shape. The outer circumferential shape of the first member 70 may be a polygonal shape (e.g., hexagonal shape). The length of the first member 70 is not less than a length corresponding to the total of the depth of the recess 42 and the thickness of the small diameter portion 44a. That is, the length of the first member 70 is set in a manner that, when the first member 70 is inserted into the recess 42, the first member 70 is disposed also in the small diameter portion 44a of the positioning hole 44.

A male screw 72a, which is screwed with the female screw 70a of the first member 70, is provided in the outer circumferential portion of the second member 72. The outer diameter of the second member 72 is smaller than the outer diameter of the first member 70. The second member 72 is an elongated rod member forming a pin main body. The second member 72 has the same length as the positioning pin 40 (FIG. 2).

The method of assembling the fuel cell stack 12 using the positioning pins 40e includes disposing the at least two positioning pins 40e at the end 16e of the stack case 16 (pin disposing step), placing the end plate 18 on the cell stack body 14 (FIG. 2) (plate placing step), pressing the end plate 18 to apply the tightening load to the cell stack body 14 (pressure applying step), and fixing the end plate 18 to the stack case 16 (fixing step). In this case, in the pin disposing step, in the state where the first member 70 and the second member 72 are joined together, the first member 70 is disposed in the positioning hole 44 and the recess 42. The plate placing step, the pressure applying step, and the fixing step are performed in the same manner as in the assembling method using the positioning pins 40 (FIGS. 2 to 4).

After the fixing step, in the state where the end plate 18 is deformed by the tightening load, the first member 70 is fitted into the positioning hole 44. In the structure, even if the second member 72 is rotated, the first member 70 is not rotated. Thus, as shown in FIG. 9B, as a result of rotation of the second member 72, the first member 70 moves in a direction in which the first member 70 is pulled out of the recess 42 and the positioning hole 44. When the first member 70 does not move in the axial direction relative to the second member 72 any more as a result of the first member 70 being pulled out of the small diameter portion 44a, the second member 72 is pulled out of the recess 42 and the positioning hole 44 together with the first member 70.

In the method of assembling the fuel cell stack 12 using the positioning pins 40e, at the time of assembling the stack case 16 and the end plate 18, the stack case 16 and the end plate 18 can be positioned using the at least two positioning pins 40e. Therefore, it is possible to easily perform operation of fixing the end plate 18. Further, even if the end plate 18 is deformed by the tightening load, it is possible to easily remove the positioning pins 40e after fixing the end plate 18. Furthermore, screw engagement between the first member 70 and the second member 72 is utilized, whereby, by rotating the second member 72, the first member 70 is moved in a direction in which the first member 70 is pulled out of the positioning hole 44. In this manner, it is possible to easily pull out the first member 70 from the positioning hole 44.

The present invention is not limited to the above described embodiment. Various modifications may be made without departing from the gist of the present invention.

What is claimed is:

1. A fuel cell stack comprising:
   a cell stack body including a plurality of stacked power generation cells;
   a stack case containing the cell stack body;
   an end plate fixed to an end of the stack case and configured to apply a tightening load to the cell stack body in a stacking direction; and
   a fixing member for fixing the end plate to the end of the stack case,
   wherein
   at least two recesses are provided at the end of the stack case, each of the at least two recesses being configured to hold one end of each of positioning pins configured to position the stack case and the end plate,
   a configuration of the positioning pins is different from a configuration of the fixing member,
   at least two positioning holes large enough for the positioning pins to be insertable, are provided in the end plate correspondingly to the at least two recesses,
   in a state where the fuel cell stack has been assembled, at least a part of at least one of the positioning pins is pulled out of one of the at least two position holes, and
   an inner diameter of each of the at least two positioning holes on a side closer to the stack case is smaller than an inner diameter of each of the at least two positioning holes on a side opposite to the stack case.

2. The fuel cell stack according to claim 1, wherein the stack case has a cubic shape or a rectangular parallelepiped shape, and the at least two recesses are respectively provided in two opposing sides of the end of the stack case.

3. A fuel cell stack comprising:
   a cell stack body including a plurality of stacked power generation cells;
   a stack case containing the cell stack body; and
   an end plate fixed to an end of the stack case and configured to apply a tightening load to the cell stack body in a stacking direction,
   wherein at least two recesses are provided at the end of the stack case, each of the at least two recesses being configured to hold one end of each of the positioning pins configured to position the stack case and the end plate, wherein at least two positioning holes large enough for the positioning pins to be insertable are provided in the end plate corresponding to the at least two recesses, and wherein each of the at least two positioning pins comprises a first member, and a second member that protrudes from the first member and is detachable from the first member, the first member is disposed in each of the at least two positioning holes and each of the at least two recesses, and the second member has a smaller diameter than the first member.

4. The fuel cell stack according to claim 3, wherein the first member is a hollow ring into which the second member is inserted.

5. The fuel cell stack according to claim 3, wherein the second member comprises a screw thread portion configured to be joined to the first member.

6. The fuel cell stack according to claim 1, wherein a female screw is formed in each of the at least two recesses, the female screw being configured to be screwed with a male screw provided at one end of each of the at least two positioning pins.

7. A method of assembling a fuel cell stack, the fuel cell stack comprising:
a cell stack body including a plurality of stacked power generation cells;
a stack case containing the cell stack body; and
an end plate fixed to an end of the stack case and configured to apply a tightening load to the cell stack body in a stacking direction,
the method comprising the steps of:
disposing at least two positioning pins at the end of the stack case;
inserting the at least two positioning pins respectively into at least two positioning holes provided in the end plate; and
fixing the end plate to the stack case in a state where the stack case and the end plate are positioned by the at least two positioning pins and the tightening load is applied to the cell stack body,
wherein
the at least two positioning pins contact the at least two positioning holes in part of the end plate in a thickness direction,
each of the at least two positioning pins comprises an expansion section expanding in a radial direction, in part of the at least two positioning pins in an axial direction, and
the expansion sections are configured to contact the at least two positioning holes.

8. The method of assembling a fuel cell stack according to claim 7, wherein the at least two positioning pins contact part of the at least two positioning holes on a side closer to the stack case.

9. The method of assembling a fuel cell stack according to claim 7, wherein, in the pin disposing step, a male screw provided at one end of each of the at least two positioning pins is screwed with a female screw provided in a recess provided at the end of the stack case.

10. A method of assembling a fuel cell stack, the fuel cell stack comprising:
a cell stack body including a plurality of stacked power generation cells;
a stack case containing the cell stack body; and
an end plate fixed to an end of the stack case and configured to apply a tightening load to the cell stack body in a stacking direction,
the method comprising the steps of:
disposing at least two positioning pins at the end of the stack case;
inserting the at least two positioning pins respectively into at least two positioning holes provided in the end plate; and
fixing the end plate to the stack case in a state where the stack case and the end plate are positioned by the at least two positioning pins and the tightening load is applied to the cell stack body,
wherein the at least two positioning pins contact the at least two positioning holes in part of the end plate in a thickness direction,
wherein each of the at least two positioning pins comprises a first member having a hollow ring shape, and a second member that protrudes from the first member and is detachable from the first member, the second member having a smaller diameter than the first member, and
wherein in the pin disposing step, the second member is inserted into each of the at least two positioning holes and a recess provided at the end of the stack case, and the second member is inserted into the first member.

11. The method of assembling a fuel cell stack according to claim 10, wherein, after the fixing step, the second member is pulled out of the first member.

12. A method of assembling a fuel cell stack, the fuel cell stack comprising:
a cell stack body including a plurality of stacked power generation cells;
a stack case containing the cell stack body; and
an end plate fixed to an end of the stack case and configured to apply a tightening load to the cell stack body in a stacking direction,
the method comprising the steps of:
disposing at least two positioning pins at the end of the stack case;
inserting the at least two positioning pins respectively into at least two positioning holes provided in the end plate; and
fixing the end plate to the stack case in a state where the stack case and the end plate are positioned by the at least two positioning pins and the tightening load is applied to the cell stack body,
wherein the at least two positioning pins contact the at least two positioning holes in part of the end plate in a thickness direction,
wherein each of the at least two positioning pins comprises a first member, and a second member that protrudes from the first member and is joined to the first member by screw engagement, the second member having a smaller diameter than the first member, and
wherein in the pin disposing step, in a state where the first member and the second member are joined together, the first member is disposed in each of the at least two positioning holes and in a recess provided at the end of the stack case.

13. The method of assembling a fuel cell stack according to claim 12, wherein after the fixing step, the second member is detached from the first member, and the first member is removed from each of the at least two positioning holes.

14. A method of assembling a fuel cell stack, the fuel cell stack comprising:

a cell stack body including a plurality of stacked power generation cells;
a stack case containing the cell stack body; and
an end plate fixed to an end of the stack case and configured to apply a tightening load to the cell stack body in a stacking direction,
the method comprising the steps of:
disposing at least two positioning pins at the end of the stack case;
inserting the at least two positioning pins respectively into at least two positioning holes provided in the end plate; and
fixing the end plate to the stack case in a state where the stack case and the end plate are positioned by the at least two positioning pins and the tightening load is applied to the cell stack body,
wherein the at least two positioning pins contact the at least two positioning holes in part of the end plate in a thickness direction,
wherein
each of the at least two positioning pins comprises a hollow first member having a female screw, and a second member that protrudes from the first member and is screwed with the first member,
in the pin disposing step, in a state where the first member and the second member are joined together, the first member is disposed in each of the at least two positioning holes and a recess provided at the end of the stack case, and
after the fixing step, each of the at least two positioning pins is rotated to move the first member in a direction in which the first member is pulled out of the recess.

* * * * *